US005524398A

United States Patent [19]
Miller et al.

[11] Patent Number: 5,524,398
[45] Date of Patent: Jun. 11, 1996

[54] PORTABLE COLLAPSIBLE TOWER

[75] Inventors: David B. Miller, Advance; William R. Hutchinson, Clemmons, both of N.C.

[73] Assignee: Ingersoll-Rand Company, Woodcliff Lake, N.J.

[21] Appl. No.: 489,914

[22] Filed: Jun. 13, 1995

[51] Int. Cl.⁶ .......................... E04H 12/18; B66C 23/00
[52] U.S. Cl. .................. 52/121; 52/114; 52/116; 52/117; 52/123.1; 52/119; 182/207; 362/418; 362/285
[58] Field of Search ............... 52/121, 111, 114, 52/116–118, 123.1; 248/160, 161, 188.2, 188.5; 182/207; 362/382, 403, 418, 430, 285

[56] References Cited

U.S. PATENT DOCUMENTS

| | | |
|---|---|---|
| 3,396,601 | 8/1968 | Wright ................................ 52/121 X |
| 3,463,916 | 8/1969 | De Bella ............................. 52/117 X |
| 4,220,981 | 9/1980 | Koether . |
| 4,388,033 | 6/1983 | Pipes . |
| 4,420,917 | 12/1983 | Parlanti . |
| 4,468,904 | 9/1984 | O'Malley . |
| 4,594,824 | 6/1986 | Ziegler . |
| 4,600,980 | 7/1986 | Dahlgren . |
| 4,655,323 | 4/1987 | Bocker . |
| 5,115,606 | 5/1992 | Renegar et al. . |
| 5,129,199 | 7/1992 | Miller et al. . |
| 5,168,680 | 12/1992 | Matlock . |

FOREIGN PATENT DOCUMENTS 0954269  9/1974  Canada .................................. 52/121

OTHER PUBLICATIONS

L6 and L8 Portable Light Towers Brochure, ©1992 by Ingersoll–Rand Company, Form 2116B.

*Primary Examiner*—Robert J. Canfield
*Attorney, Agent, or Firm*—Michael M. Gnibus

[57] ABSTRACT

A portable collapsible tower including a frame, at least one stationary tower member fixed to the frame and at least one movable tower member movable along the exterior portion of the stationary tower member relative to the stationary member. A coupling, movably couples the stationary and movable tower members for movement along the exterior portions. At least one cable located along the exterior portions of the tower members, is used to extend and retract the tower members and a light or tool support bar. As the tension in the one or more cables is altered by a tension altering device, the support bar and tower members are moved between fully extended and fully retracted positions.

16 Claims, 9 Drawing Sheets

PORTABLE COLLAPSIBLE TOWER

BACKGROUND OF THE INVENTION

This invention generally relates to portable towers for raising lights or tools above the ground and more particularly to portable collapsible towers with at least one stationary tower member and at least one movable tower member that is extendable and retractable with respect to the at least one stationary tower member. Portable towers are typically used at construction or other work sites to raise lights or tools above the ground.

The use of portable towers to support lights or tools is well known in the art. Known portable towers usually are transported on and supported by a portable vehicle. Typically, the portable towers include a number of hollow, concentrically oriented tower members. The portable tower includes a stationary tower member fixed to the vehicle frame and one or more movable tower members extendable and retractable, relative to the stationary tower member, in a telescoping manner.

It is also well known in the art to extend and retract the one or more movable tower members using a cable system located in the hollow interiors of the tower members. Such a known cable system is generally comprised of one or more cables in combination with a number of pulleys with a cable connected to a tension altering device, usually a hand operated crank or winch mounted on the vehicle. By moving the crank in a first direction, the tension in the one or more cables is increased causing the one or more movable tower members to extend in a telescoping manner, relative to the stationary tower member. Movement of the crank in a second direction retracts the one or more movable tower members in a telescoping manner, relative to the stationary tower member.

There are a number of problems associated with the known portable towers. First, it is difficult to repair and troubleshoot known cable systems. Currently, if a cable breaks or another component of the cable system fails, making it necessary to gain access to the system, the portable tower must be disassembled. When the tower is disassembled for repair, it can not be used. Troubleshooting and repairing the tower can take a significant period of time. Significant portable tower downtime can negatively affect productivity at a work site or another location where use of the tower is required.

Second, because known cable systems are hidden from view, it is burdensome to conduct periodic inspections of the cable system to anticipate cable system component failure. In order to conduct such periodic inspections, disassembly of the tower is required. Because disassembly of the tower is required, such periodic inspections may not be conducted at all or may only be conducted sporadically. As a result, a component part failure, which could have been anticipated by periodic inspection, may occur and damage the tower.

Finally, operation of known portable towers can be complicated. In addition to the movable and stationary tower members and cable system, known portable towers may also include a number of latches in combination with one or more winches. In operation, each latch and winch must be operated in the proper sequence in order to extend and retract the tower members.

The foregoing illustrates limitations known to exist in present portable towers and associated methods. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a portable collapsible tower comprising: a frame; at least one stationary tower member fixed to the frame, the at least one stationary tower member including an exterior portion; at least one movable tower member having an end, the at least one movable member movable along the exterior portion of the at least one stationary tower member, relative to said stationary member, said at least one movable tower member movable along a longitudinal axis between a retracted position where said end is located near said at least one stationary tower member and an extended position where said end is located away from said stationary tower member, said movable member also including an exterior portion; coupling means for movably coupling the at least one movable tower member and said at least one stationary tower member; a support bar movably mounted on one of said at least one movable tower member to be movable with the movable tower member and about an axis; first means for moving said at least one movable tower member and support bar, said first means located along said tower member exterior portions and having a tension; tension altering means for changing the tension in said first means to thereby move said at least one movable tower member and support bar.

The foregoing and other aspects will become apparent from the following detailed description of the invention when considered in conjunction with the accompanying drawing figures.

DETAILED DESCRIPTION

Figure 1:
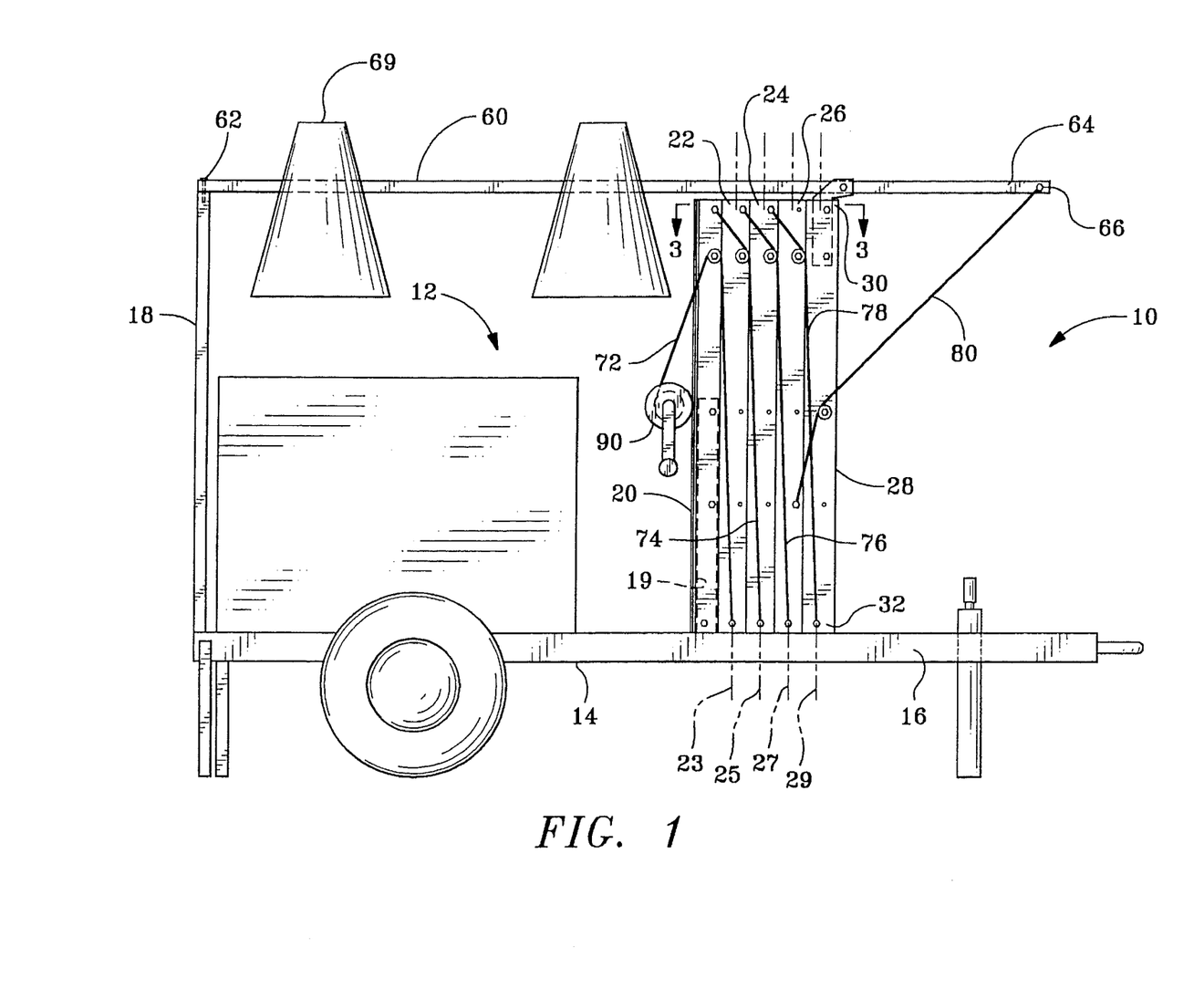
FIG. 1 is a side elevational view illustrating a vehicle with a portable tower according to one embodiment of the present invention, with the tower in a fully retracted position.

Referring now to the drawings, wherein similar reference characters designate corresponding parts throughout the several views, FIG. 1 shows portable collapsible tower 10 that is transported on and supported by vehicle 12 which includes frame 14. A generator (not shown) is contained in vehicle 12 to supply power to the lights or tools that are supported by the tower. Upwardly extending support plate 18 is mounted on the frame away from frame drawbar 16. Frame 14 also includes elongate rod 19. The rod is fixed to the drawbar at one end and extends upwardly, away from the drawbar.

Figure 6:
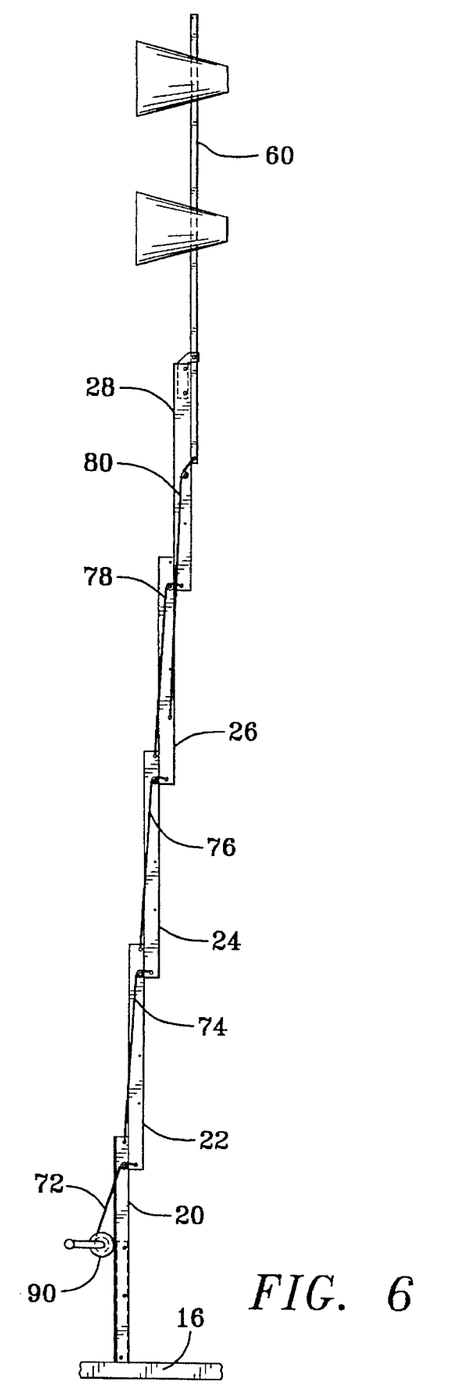
FIG. 6 is a side elevational view of the portable tower, according to one embodiment of the present invention, showing the portable tower in a fully extended position.

Portable tower 10 includes at least one stationary tower member fixed to frame 14 and at least one movable tower member, movable relative to the stationary tower. According to the present invention, the portable tower includes one stationary tower member 20 and four movable tower members 22, 24, 26, and 28 like the stationary tower member. The movable tower members are movable between a fully retracted position as shown in FIG. 1 and a fully extended position as shown in FIG. 6. Each of the movable tower members 22, 24, 26 and 28 is movable along a respective longitudinal axis 23, 25, 27 and 29. The disclosed combination of one stationary and four movable tower members is exemplary only and it is contemplated that portable tower 10 may include any combination of stationary and movable tower members.

Stationary tower member 20 is like each of the movable tower members. Each tower member has a first end 30, and a second end 32. As shown in FIG. 1, the second end of each tower member is seated on drawbar 16 when the tower members are in the fully retracted position. Each tower member also includes longitudinal sides 36, 38, 40 and 42 which define tower member interior 44 that extends longitudinally, through the ends 30 and 32.

Tower member 20 is maintained stationary by rod 19 which is located in interior 44 of the tower member as shown in FIG. 1. Tower member 20 is connected to the rod by a conventional bolt connection, pin connection or the like.

Figures 3, 4:
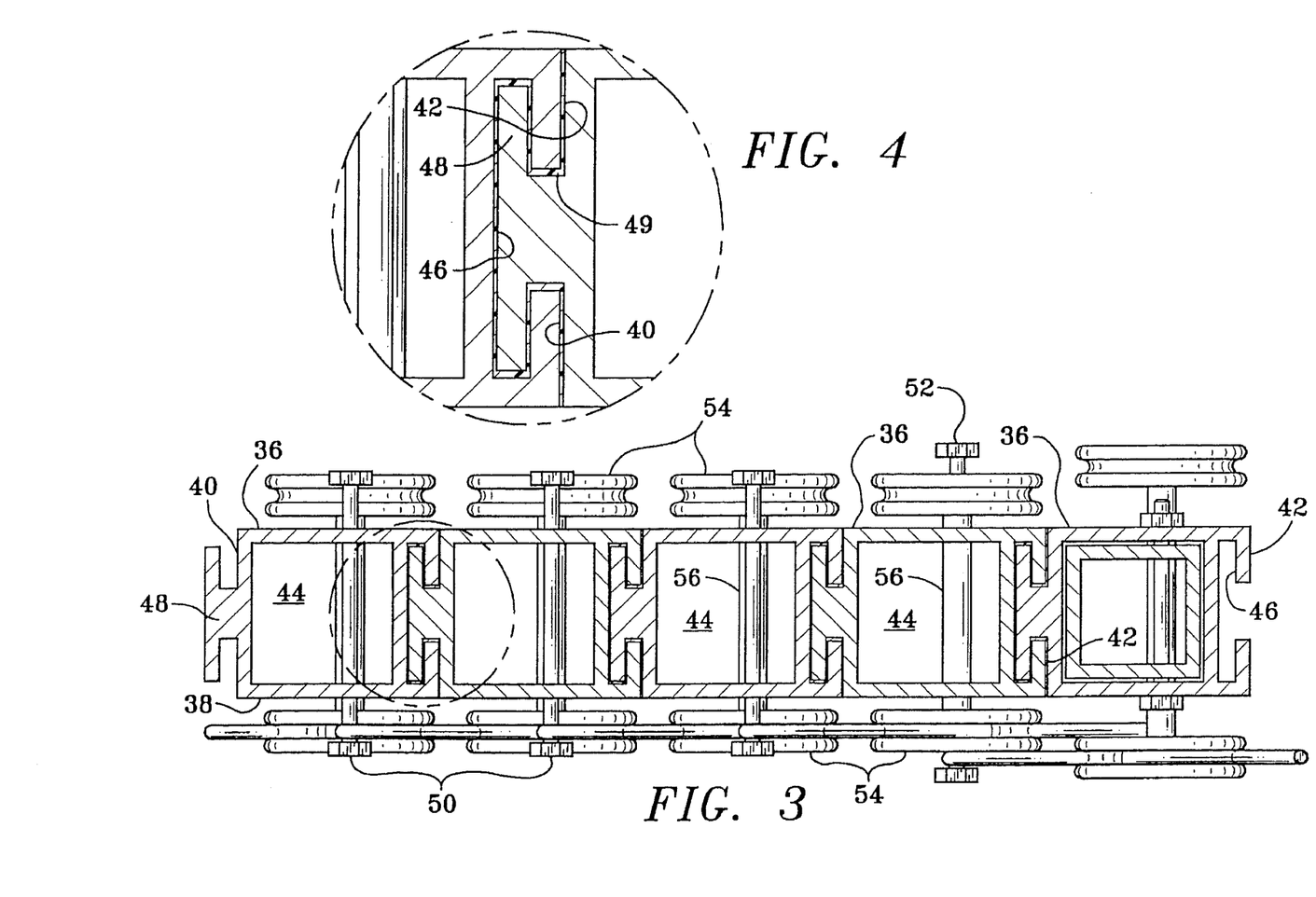
FIG. 3 is a sectional view taken along line 3—3 of FIG. 1.
FIG. 4 is an enlarged sectional view of a portion of FIG. 3.

Each tower member includes a slot 46 and a guide 48. Slot 46 is disposed on side 42 and extends longitudinally through ends 30 and 32. The slot has a T-shaped cross-section which is shown most clearly in FIG. 3. Guide member 48 is disposed on longitudinal tower side 40, opposite tower side 42 and extends between the ends of the tower member. The guide member has a T-shaped cross section and is adapted to be fitted in a slot to be movable longitudinally, in the slot. As shown in FIG. 3, each of the guide members of movable tower members 22, 24, 26 and 28 is slidably fitted in the slot 46 of the adjacent tower member thereby movably coupling adjacent tower members. Tower member longitudinal side 40 is located immediately adjacent the longitudinal side 42 of the next adjacent tower member when the guide is located in the slot. It should be understood that any number of alternate slot/guide coupling configurations may be employed and that the illustrated T-shaped coupling configuration is merely exemplary.

A bearing surface 49 is provided in slot 46 and exterior portions of wall 42. See FIG. 4. According to the present invention, the bearing surface is a graphite or teflon based coating that is sprayed or otherwise applied to the slot and exterior of longitudinal wall 42. It is contemplated that the surface may be comprised of conventional grease or may be a plastic bearing member. The bearing surface serves to limit friction between the guide member and the slot.

Figure 5:
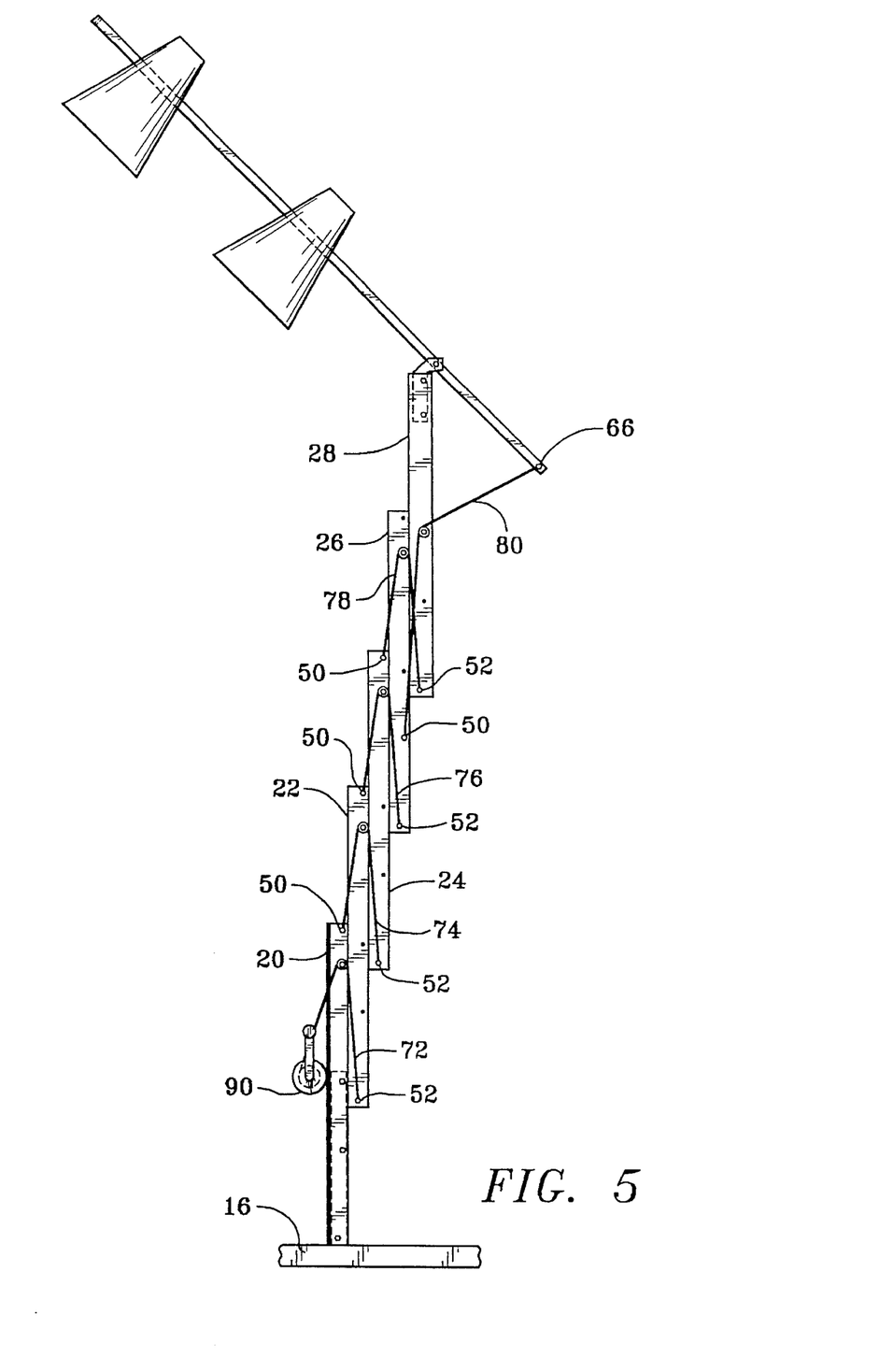
FIG. 5 is a side elevational view of the portable tower according to one embodiment of the present invention, showing the portable tower in an intermediate, partially extended position.

Tower members 20, 22, 24 and 26 each include a first connecting member 50 which extends through tower interior 44 and outward from openings (not shown) formed in opposite longitudinal tower sides 36 and 38. In tower members 20, 22 and 24 the connecting member 50 is located adjacent the first tower member end 30. Member 50 is located below the middle of tower member 26 as shown in FIG. 5. Additionally, tower members 22, 24, 26 and 28 include a second connecting member 52, like the first connecting member. The second connecting member extends through the tower interior and outward from openings formed in opposite longitudinal tower sides 36 and 38, adjacent the second tower member end. In this way, the opposite ends of the first and second connecting members are located along the exterior of the tower members. The connecting members may be comprised of a nut and bolt connection or another like member and may be a single elongate member as shown in the present invention or two separate members.

Pulleys 54 are located along the exterior portions of the tower members. See FIG. 3. The pulleys are mounted for use on the ends of shafts 56. The shaft ends extend through openings formed in walls 36 and 38. As shown in FIG. 1, the pulleys of tower members 20, 22, 24 and 26 are located near tower member first end 30. The pulleys of member 28 are located at approximately the middle of the longitudinal length of the tower member. It is contemplated that only one pulley be mounted for use on each of the shafts. The pulleys are easily accessible if repair or replacement of the pulleys is required.

Figures 2, 7:
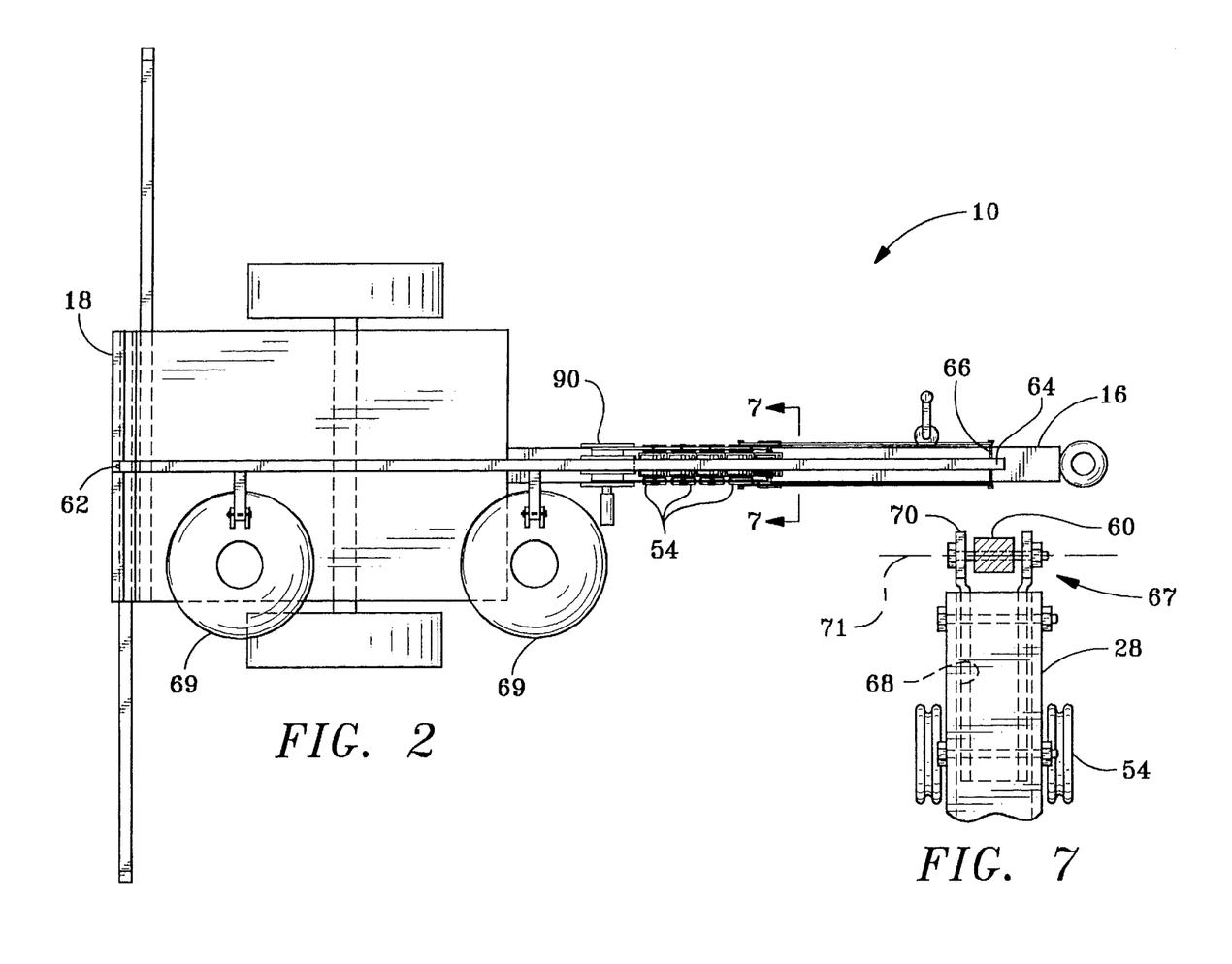
FIG. 2 is a top view of the portable tower of FIG. 1.
FIG. 7 is a sectional view taken along line 7—7 of FIG. 2.

Elongate support bar 60 has a first end 62, a second end 64 and a connecting member 66, at the second end. The support bar is movably connected to pedestal 67 intermediate the two bar ends and the pedestal is in turn connected to tower member 28. In this way, the support bar is movable with tower member 28 during extension and retraction of tower 10. In FIG. 2, lights 69 are shown supported by the bar however, other objects of interest such as tools or the like may also be supported by the bar. As shown in FIG. 1, first end 62 is supported by plate 18 when the bar is in the fully retracted position. A conventional connection maintains the bar end against the plate when the tower is transported or otherwise not being used.

Pedestal 67 includes a post 68 and a collar 70. The post is located in the interior 44 of tower member 28 so that the collar is adjacent the first end 30 of member 28 as shown in FIG. 1. The post is maintained in the interior by conventional connection means. The support bar is movably connected to the collar by a pin connection to be rotatable about axis 71 defined by the connection, between the fully retracted position of FIG. 1 and the fully extended position of FIG. 6. As shown in FIG. 1, the bar is connected to the collar, away from the post to permit movement of the bar. When the support bar is in the fully extended position, further extension of the bar is limited by tower member 28.

Tower 10 includes first means for moving tower members 22, 24, 26, 28 and the support bar. The first means is comprised of a first cable 72, a second cable 74, a third cable 76, a fourth cable 78, and a fifth cable 80. All of the cables are located along the exterior portions of the tower members, as shown in FIGS. 1 and 3. It is contemplated that the cables may be metal straps, rope or the like. According to the present embodiment of the invention, the cables are positioned adjacent only longitudinal sides 38 of the tower members. It should be understood that an additional set of cables like cables 72–80 could be positioned, according to the present invention, adjacent tower member sides 36. If parallel sets of cables are provided and one of the sets breaks or otherwise becomes inoperative, the remaining set of cables can effectively extend and retract the movable tower members. Because the cables are located on the exterior portion of the tower members, the cables can be easily inspected and repaired.

Additionally, if tower 10 included more or fewer than 5 tower members, the number of cables comprising the first means for moving the tower members and support bar may be increased or decreased as required.

Each of cables 74, 76, 78 and 80 is connected at one end to a connecting member, extends away from the connecting member, continues around a pulley and is connected at a second end to another connecting member.

The fifth cable 80 is connected at one end to connecting member 66 of the support bar. The cable extends away from the one end connection to pulley 54 of tower member 28, continues around the pulley and extends therefrom to connecting member 50 of tower member 26. The cable is connected at a second end to the connecting member 50 of tower member 26.

Fourth cable 78 is connected at one end to connecting member 52 of tower member 28. The cable extends away from the one end connection to pulley 54 of tower member 26, continues around the pulley and extends therefrom to connecting member 50 of tower member 24. The cable is connected at a second end to the connecting member 50 of the tower member 24.

Third cable 76 is connected at one end to connecting member 52 of tower member 26. The cable extends away from the one end connection to pulley 54 of tower member 24, continues around the pulley and extends therefrom to connecting member 50 of tower member 22. The cable is connected at a second end to the connecting member 50 of the tower member 22.

Second cable 74 is connected at one end to connecting member 52 of tower member 24. The cable extends away from the one end connection to pulley 54 of tower member 22, continues around the pulley and extends therefrom to connecting member 50 of tower member 20. The cable is connected at a second end to the connecting member 50 of the tower member 20.

First cable 72 is connected at one end to connecting member 52 of tower member 22. The cable extends from the one end connection to pulley 54 of tower member 20, continues around the pulley and extends therefrom to tensioning means 90. The cable is movably connected at a second end to the tensioning means.

Tensioning means 90 for altering the tension in the cables is mounted externally on guide member 48 of stationary tower member 20. The tensioning means may be a conventional winch or the like.

In operation, vehicle 12 is placed at the required location. If it is necessary to reposition lights 69, the connection members at support bar ends 62 and 64 and at the collar 70 are removed and the support bar is rotated or otherwise moved to reposition the lights as required. The connection members previously removed from the collar and bar end 64 are then returned thereto. The connection member previously removed from bar end 62 is not returned to the end 62. If initial repositioning of lights is not required, only connection member at support bar end 62 is removed.

After the vehicle and lights are positioned as required, tensioning means is rotated in a first direction and the second end of cable 72 is wound around the tensioning means. As the second end of the cable is drawn around the tensioning means, the tension in first cable 72 is increased. The tower member 22 is pulled upward at connecting member 52 of tower member 22 and moved from the fully retracted position of FIG. 1. The tower member is moved along longitudinal axis 23.

The upward displacement of pulley 54 of tower member 22 increases the tension in cable 74 and as a result, tower member 24 is pulled upward at connecting member 52 of tower member 24 and is moved from the fully retracted position. As tower member 24 is extended, pulley 54 of tower member 24 increases the tension in cable 76 and tower member 26 is pulled upward at connecting member 52 of tower member 26. As tower member 26 is extended, pulley 54 of tower member 26 increases the tension in cable 78 and tower member 28 is pulled upward at connecting member 52. As tower member 28 is extended, support bar is moved upward with the tower member. Upward movement of pulley 54 of tower member 28, increases the tension in cable 80. The increase in tension causes support bar 60 to rotate about rotation axis 71 as it moves with the tower member.

As the tower members are extended, relative to the fixed tower member 20, they form a staircase-like configuration as shown in FIG. 5 with the first ends of adjacent tower members separated by a distance. Each of the tower members is extended along its respective longitudinal axis. Continued movement of the tensioning means in a first direction, moves the tower members and support bar away from the fully retracted position thereby increasing the distances between adjacent first tower ends, in the manner previously described. The tensioning means is rotated until the tower members and support bar are fully extended as shown in FIG. 6. The tensioning means is then locked to maintain the portable tower in the fully extended position.

Movement of the tensioning means in a second direction displaces the movable tower members and support bar from the fully extended position. As the tensioning means is moved in a second direction, the tower members are pulled downwards and retracted, and support bar 60 is rotated counterclockwise about axis 71. As the tower members are retracted, relative to stationary member 20, they form a staircase-like configuration and the distances separating the ends of the tower members are decreased as the portable tower is retracted. The tensioning means is moved in the second direction until the tower members and support bar are fully retracted.

FIGS. 8–11, illustrate portable tower 92, an alternate embodiment of the present invention. Tower 92 includes vehicle 12, frame 14, tower members 20, 22, 24, 26, and 28, pulley 54, support bar 60 and tensioning means 90 of the previously described embodiment of the present invention. Tower 92 includes pulleys 54 located on the exterior portions and adjacent the first and second ends of tower members 22, 24 and 26. Stationary tower member 20 includes pulleys adjacent first end 30. Tower member 28 includes pulleys adjacent second end 32 and at approximately the middle of the tower member. The pulleys are mounted for use on ends of shafts 56. The pulleys are located adjacent the exterior portions of longitudinal sides 36 and 38. Since the pulleys are located along the exterior portions of the tower members and readily accessible, repair or replacement of the pulleys is easily achieved.

Figure 8:
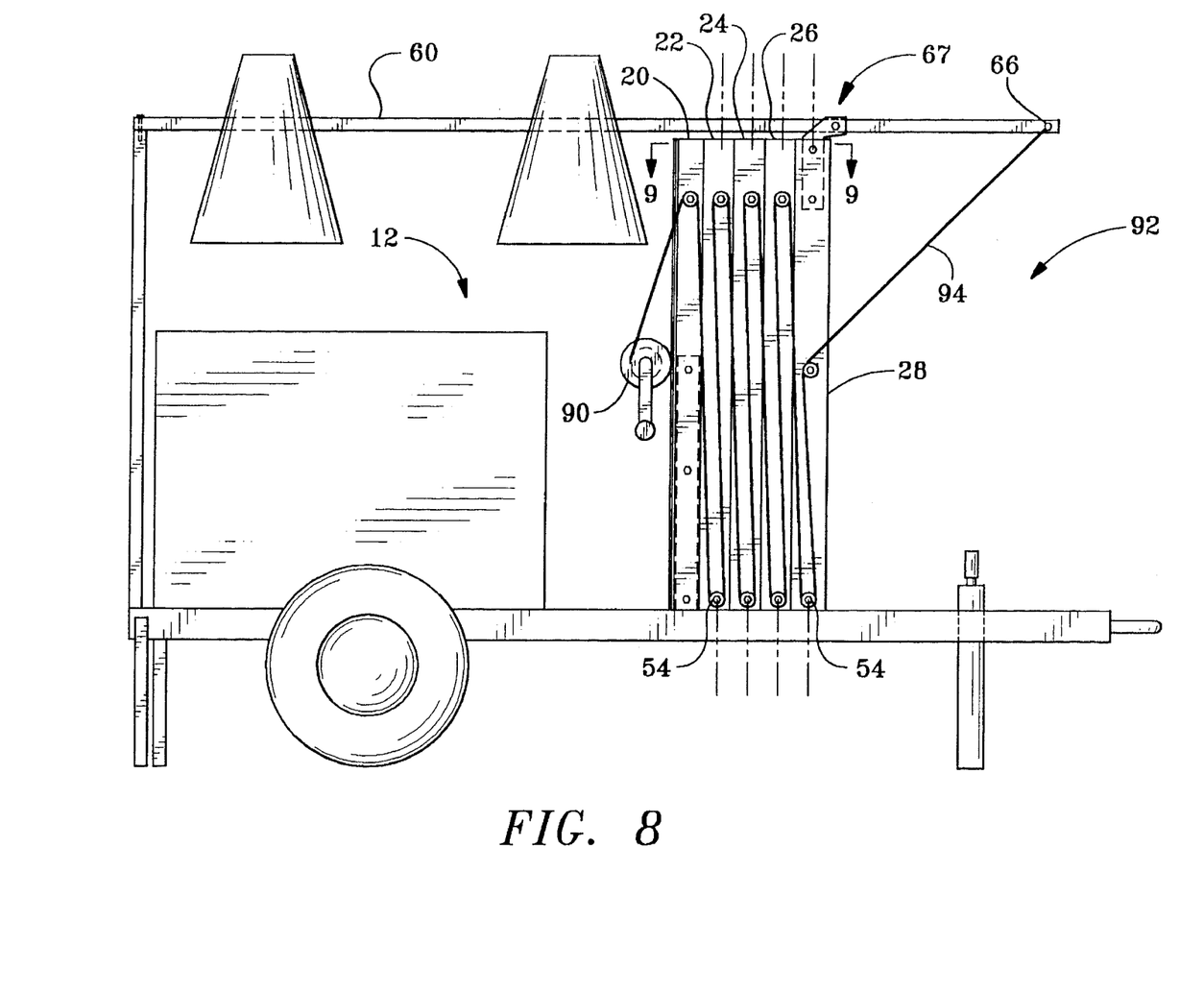
FIG. 8 is a side elevational view like FIG. 1, illustrating a vehicle with a portable tower according to an alternate embodiment of the present invention, with the tower in a fully retracted position.
Figure 9:
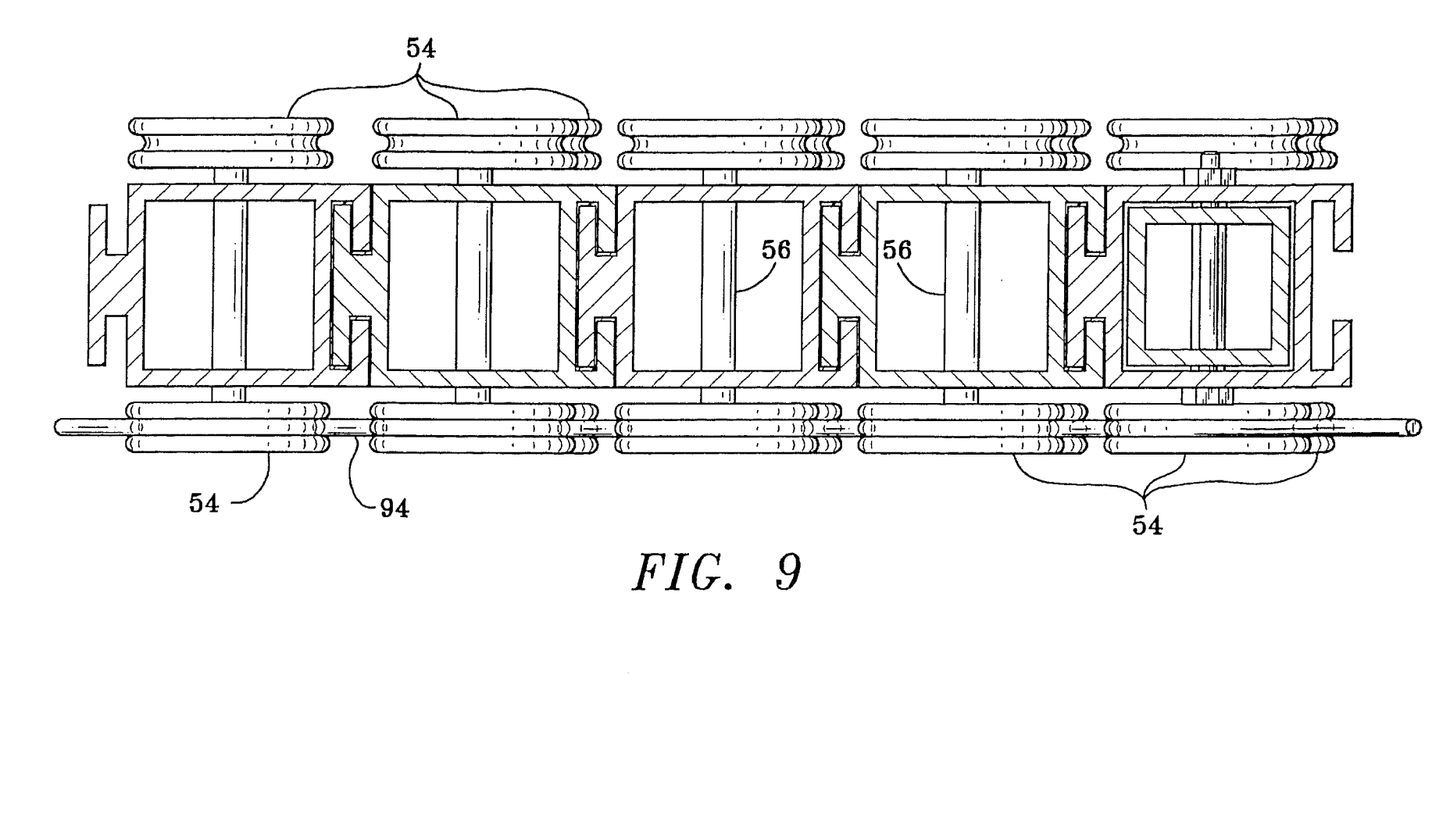
FIG. 9 is a sectional view taken along line 9—9 of FIG. 8.
Figure 10:
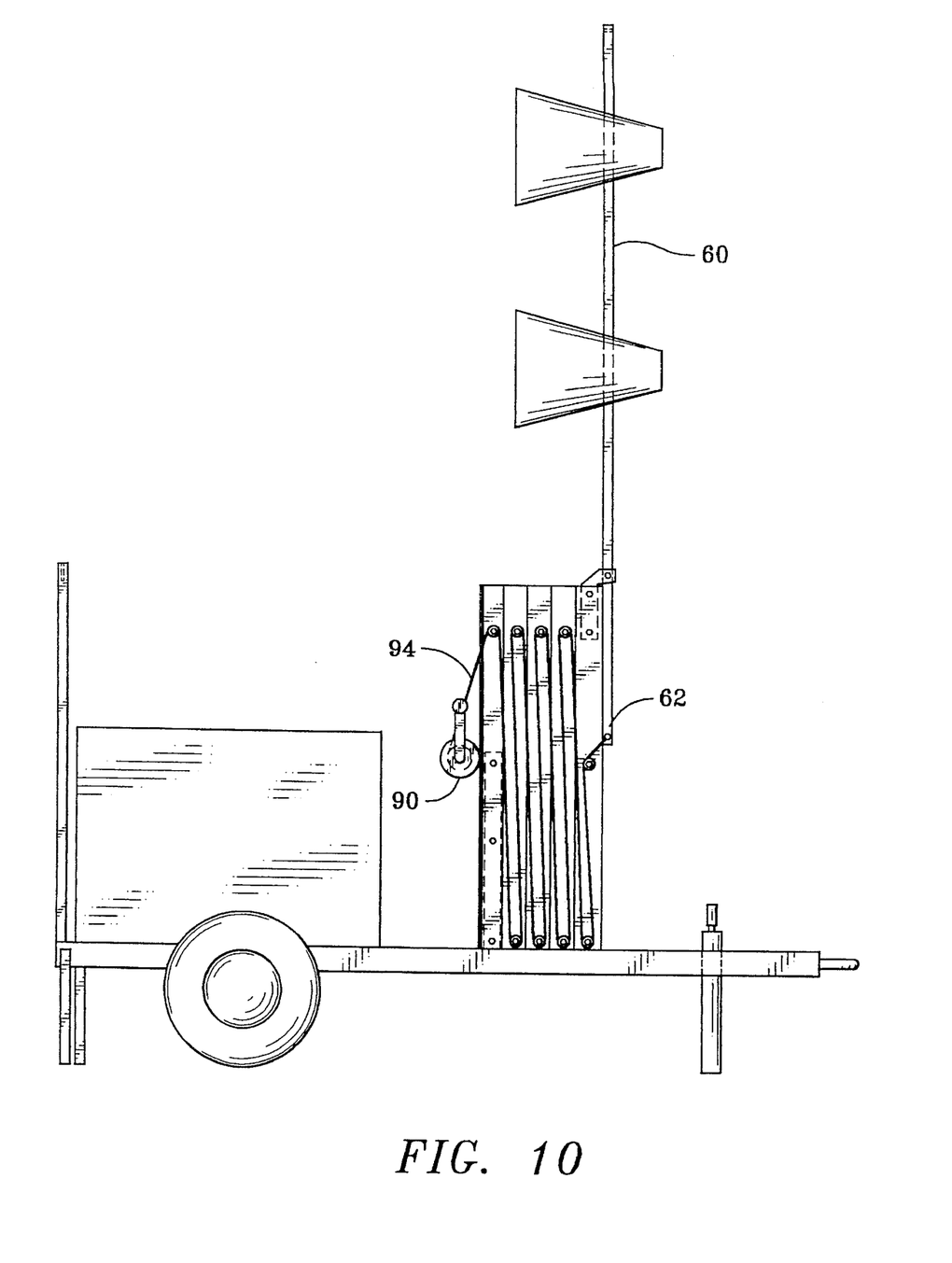
FIG. 10 is a side elevational view like FIG. 7, illustrating the portable tower according to an alternate embodiment of the present invention, with the tower in an intermediate, partially extended position.

The alternate embodiment of the present invention includes first means for extending and retracting the tower members relative to the stationary tower member. The first means is comprised of cable 94 located adjacent longitudinal sides 38. The cable is connected at one end to connecting member 66 of support bar 60. The cable extends away from the bar 60 to pulley 54 near middle portion of tower member 28, continues around the pulley and toward pulley 54 adjacent end 32 of tower member 28. The cable continues around the pulley to the pulley at upper end 30 of the adjacent tower member 26. The cable continues around the pulleys in a serpentine pattern as shown in FIG. 8. The cable is connected at a second end to tensioning means 90.

In the alternate embodiment of the present invention, first means is comprised of a single cable, however, it is contemplated that a second cable like cable 94 located adjacent sides 36 and having a serpentine configuration like cable 94 could be utilized in combination with the cable previously described. If one of the cables should break or is otherwise unusable, the tower 92 could still be extended and retracted by the remaining "good" cable. Because the cables are located along the exterior portions, the cables are readily accessible, making repair, replacement and inspection of the cables easy.

In operation, after the vehicle 12 and lights 69 are positioned in the manner previously described, the tensioning means is rotated in a first direction to thereby draw the second cable end around the tensioning means, thereby increasing the tension in cable 94. The initial increase in the cable tension causes the support bar 60 to rotate clockwise from the fully retracted position of FIG. 8 to the fully extended position shown in FIG. 10.

Figure 11:
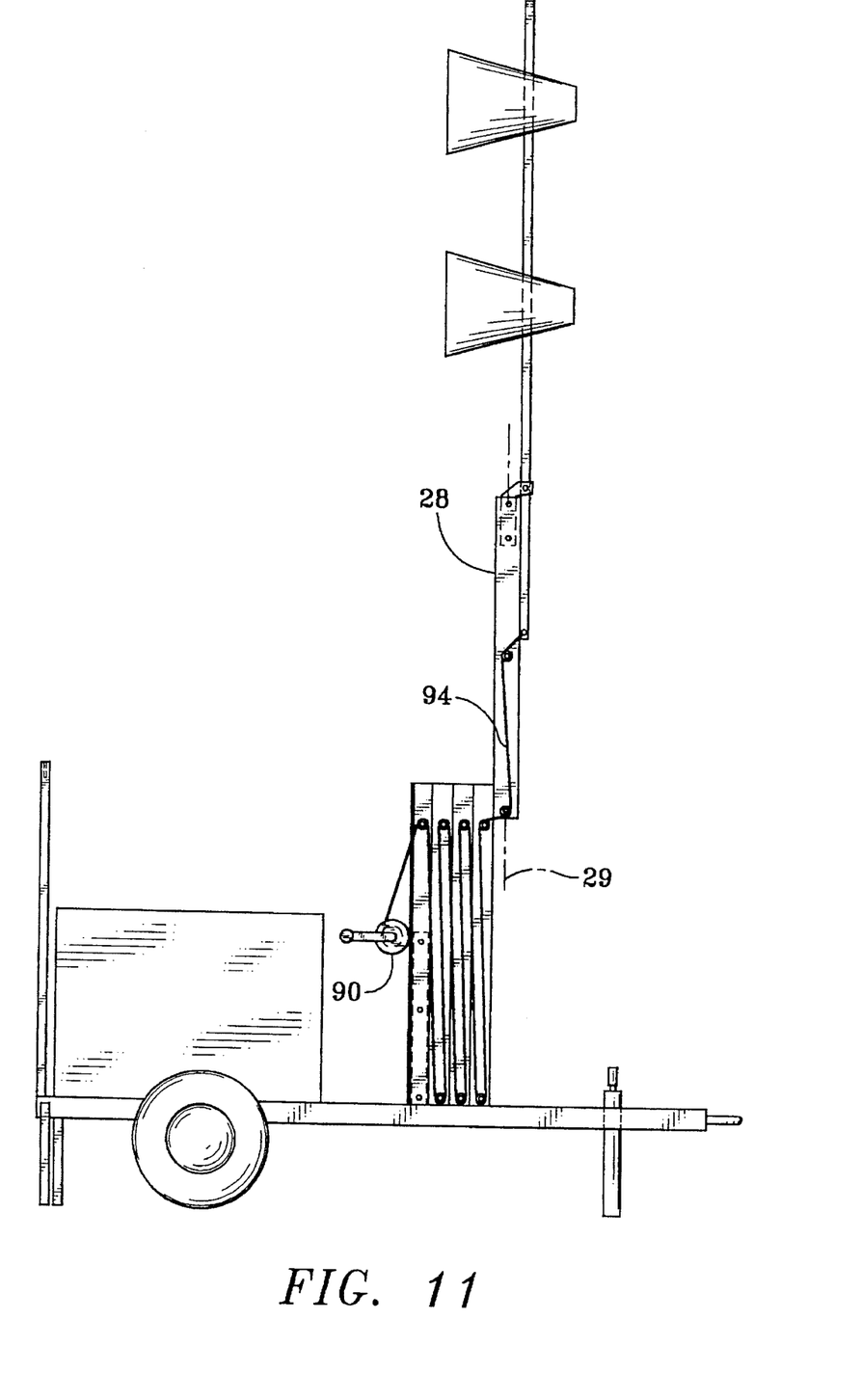
FIG. 11 is a side elevational view like FIG. 9, illustrating the portable tower according to an alternate embodiment of the present invention, with the tower in another intermediate, partially extended position.

Continued movement of the tensioning means extends tower member 28 along longitudinal axis 29, relative to the other tower members. The previously extended support bar is moved with the member 28. The extended tower member and support bar are shown in FIG. 11. Further movement of the tensioning means extends tower member 26 and further extends tower member 28 and support bar 60, relative to the other tower members, as previously described. Each time a tower member is extended, the tower member, support bar and other previously extended tower members are extended together. Tensioning means is moved until the support bar is at the required height or all of the tower members are fully extended as shown in FIG. 6.

The tower 92 is retracted by moving the tensioning means in a second direction opposite the first direction. The tower members are retracted one at a time starting with the extended tower member nearest stationary tower member 20. As the tower member is retracted, the remaining extended tower members and support bar are moved downward. The tensioning means is moved in the second direction until the tower is retracted to the required height or until support bar is fully retracted.

While we have illustrated and described a preferred embodiment of our invention, it is understood that this is capable of modification, and we therefore do not wish to be limited to the precise details set forth, but desire to avail ourselves of such changes and alterations as fall within the purview of the following claims.

Having described the invention, what is claimed is:

1. A portable collapsible tower comprising:
   a) a frame;
   b) at least one stationary tower member fixed to said frame, said at least one stationary tower member including an exterior portion;
   c) at least one movable tower member having an end, said at least one movable member movable along the exterior portion of and relative to said at least one stationary tower member, said at least one movable tower member movable along a longitudinal axis between a retracted position where said end is located near said at least one stationary tower member and an extended position where said end is located away from said stationary tower member, said at least one movable member also including an exterior portion;
   d) coupling means for movably coupling the at least one movable tower member and said at least one stationary tower member;
   e) a support bar movably mounted on one of said at least one movable tower member to be movable with said at least one movable tower member and about an axis;
   f) first means for moving said at least one movable tower member and support bar, said first means located along each said tower member exterior portion, connected to an end of said support bar, and having a tension;
   g) tension altering means for changing the tension in said first means to thereby move said at least one movable tower member and support bar.

2. A portable tower as claimed in claim 1, and wherein each of said at least one stationary and movable tower members includes a first side and a second side and wherein said coupling means is comprised of a slot disposed on each first side of the tower members and a guide disposed on each tower member second side, said guide adapted to be slidably fitted in said slot.

3. A portable tower as claimed in claim 2, wherein each said slot and guide have T-shaped cross sections and each said slot includes a bearing surface.

4. A portable tower as claimed in claim 1, wherein said at least one movable tower member and at least one stationary tower member include a first side and wherein said first means for moving said at least one movable tower member and support bar includes at least one cable adjacent said first side.

5. A portable tower as claimed in claim 4, wherein said at least one movable tower member and said at least one stationary tower member include a second side and wherein said first means for moving said at least one movable tower member and support bar includes at least one cable adjacent said second side.

6. A portable tower as claimed in claim 1, wherein there is one stationary tower member having a first side, a first connecting member and a pulley adjacent said first side and wherein there are first, second, third and fourth movable tower members each having a first side, a first connecting member, a second connecting member and a pulley adjacent said first side and wherein the first means for moving includes five cables adjacent said first sides.

7. A portable tower as claimed in claim 6, wherein the one stationary tower member includes a second side and a first connecting member and a pulley adjacent said second side and wherein said first, second, third and fourth movable tower members each has a second side, a first connecting member, a second connecting member and a pulley adjacent said second side and wherein said first means for moving also includes five cables adjacent the second sides.

8. A portable tower as claimed in claim 1, wherein there is one stationary member having a first side, and a first pulley adjacent the first side, and wherein there are first, second, third and fourth movable tower members each having a first side and a second and a third pulley adjacent said first side and wherein said first means for moving includes a cable that extends around the pulleys in a serpentine configuration adjacent the first sides.

9. A portable tower as claimed in claim 8, wherein the one stationary member has a second side opposite said first side, and a first pulley adjacent the second side, and wherein the first, second, third and fourth movable tower members each has a second side opposite the first side and a second and a third pulley adjacent said second sides and wherein said first means for moving also includes a cable that extends around the pulleys in a serpentine configuration adjacent the second sides.

10. A portable tower as claimed in claim 1, wherein the at least one stationary tower member has a hollow interior, and said frame includes a rod adapted to be fitted in said interior and connected to said at least one stationary tower member.

11. A portable tower as in claim 1, wherein one of the at least one movable tower has a hollow interior and includes a pedestal having a collar and a post adapted to be fitted in said interior and connected to said one tower member, said support bar adapted to be rotatably mounted to the collar.

12. A portable collapsible tower comprising:
   a) a frame;
   b) a stationary tower member fixed to said frame, said stationary tower member including a first side, a second side, a first end, a second end and an exterior portion;
   c) a first movable tower member, movable relative to said stationary member, said first movable tower member having a first side, a second side, a second end, an axis and an exterior portion said first tower member movable along said axis between a first position where its second end is located away from said frame and a second position where its second end is proximate the frame;
   d) at least one intermediate movable tower member located between said first movable tower member and said stationary tower member, said at least one intermediate movable tower member movable relative to said stationary tower member and including a first side, a second side, a second end, an axis and an exterior portion said at least one intermediate movable tower member movable along said axis between a first position where its second end is located away from said frame and a second position where its second end is located proximate the frame;
   e) coupling means for movably coupling said tower members, so that the first side of one tower member is adjacent the second side of the adjacent tower member;
   e) a support bar movably mounted to said first movable tower member to be movable with said first tower member and about an axis;
   f) first means for moving said first movable tower member and at least one intermediate movable tower member and support bar, said first means located along each said tower member exterior portion, connected to an end of said support bar, and having a tension;
   g) tension altering means for changing the tension in said first means to thereby move said first movable tower member, at least one intermediate movable tower member and support bar.

13. A portable tower as claimed in claim 12, and wherein said coupling means is comprised of a slot disposed on each tower member first side and a guide disposed on each tower member second side, said guide adapted to be slidably fitted in said slot.

14. A portable tower as claimed in claim 13, wherein said slot and guide have T-shaped cross sections and said slot includes a bearing surface.

15. A portable tower as claimed in claim 12, each tower member further having third and fourth sides wherein said first means for moving said first tower member, at least one intermediate movable tower member and support bar includes at least one cable adjacent said third sides.

16. A portable tower as claimed in claim 15, wherein said first means for moving said first tower member, at least one intermediate movable tower member and support bar includes at least one cable adjacent said fourth sides.

* * * * *